United States Patent [19]
Linder et al.

[11] Patent Number: 5,966,462
[45] Date of Patent: Oct. 12, 1999

[54] METHOD AND SYSTEM FOR PROCESSING AND RENDERING OBJECT ORIENTED NEUTRAL IMAGE DATA

[75] Inventors: Stephen F. Linder, Fairport; Craig H. Mallery, Webster, both of N.Y.

[73] Assignee: Xerox Corporation, Stamford, Conn.

[21] Appl. No.: 08/878,800

[22] Filed: Jun. 19, 1997

[51] Int. Cl.$^6$ .................................................... G06K 9/34
[52] U.S. Cl. ....................... 382/173; 382/176; 358/540; 358/462
[58] Field of Search ................................ 358/540, 462, 358/467; 382/290, 173, 176

[56] References Cited

U.S. PATENT DOCUMENTS

| | | | |
|---|---|---|---|
| 5,767,978 | 6/1998 | Revankar et al. | 358/296 |
| 5,850,474 | 12/1998 | Fan et al. | 382/173 |

FOREIGN PATENT DOCUMENTS

| | | |
|---|---|---|
| 0 665 675 A2 | 8/1995 | European Pat. Off. . |
| 0 665 676 A2 | 8/1995 | European Pat. Off. . |
| 0 665 677 A2 | 8/1995 | European Pat. Off. . |

*Primary Examiner*—Phuoc Tran
*Attorney, Agent, or Firm*—Michael J. Nickerson

[57] ABSTRACT

A system and method processes object oriented image data by initially parsing the object oriented image data into non-neutral image data and neutral image data. A second parser circuit parses the neutral image data into black image data, grey image data, and white image data. A neutral processing circuit processes the black image data, grey image data, and the white image data. The system also classifies object oriented image data to be rendered by an object oriented rendering system. To perform the classification, the object oriented image data to be rendered is received and classified and assigned as one of a plurality of possible first level object types. The process further classifies and assigns, to the object oriented image data to be rendered, one of a plurality of possible second level object types related to the first level object type assigned to the object to be rendered.

10 Claims, 7 Drawing Sheets

METHOD AND SYSTEM FOR PROCESSING AND RENDERING OBJECT ORIENTED NEUTRAL IMAGE DATA

The present invention relates to the processing and rendering of object oriented image data in a digital color printing or reproduction system. More specifically, the present invention relates to the processing and rendering of object oriented neutral image data separately from the non-neutral image data and is based upon the object type and object sub-type classification of the image data.

BACKGROUND OF THE PRESENT INVENTION

The use of color in the digital environment has created problems for color printers trying to produce satisfactory results. One problem facing color printers stems from the proliferation of desktop publishing software programs or applications.

The problem with these desktop publishing systems is that the systems allow the user to combine different types of objects into a composite document. For example, a user can combine photographic images, text, and business graphics (charts) into a single document wherein these images may be either color or black/white.

To achieve satisfactory results each of these objects need to processed differently so that the high quality document can be produced. For example, let assume that a digital color system is trying to render a composite document with a photographic image and a business graphic. In order to achieve high quality rendering of a photographic image, the color system may have to skew the color attributes in a certain way, but this skewing may cause the business graphics in the same composite document to appear washed out. On the other hand, if the color printing system is skewed to ensure saturated vivid colors for the business graphics, the photographic image in the composite document may lose its life-like appearance.

To resolve this problem, object oriented rendering systems have been developed. In such conventional systems, the objects which make up a composite document are rendered (processed) uniquely. In other words, a photographic object or bitmap will be processed one way, while business graphics will be processed another way. In this way, an object can be rendered to optimize its quality.

Furthermore, the neutral rendering requirements for different object types may vary. More specifically, neutral rendering refers to the appearance of black, greys, and white on a printed page or output device. This rendering may be understood in terms of process (multicolor) or true (single component) neutrals. Table 1 below provides an illustration as to how neutral rendering may vary from object to object.

TABLE 1

| OBJECT | BLACKS | GREYS | WHITES |
| --- | --- | --- | --- |
| Bitmap | Process Black | Process black | Does not have to be Paper White |
| Graphic | Single Component Black | Single Component Black | Paper White |
| Text | Single Component Black | Single Component Black | Paper White |
| Photographic | Process Black | Process Black | Does not have to be Paper |

As illustrated in Table 1, process blacks and greys may be acceptable for bitmap objects since true blacks or greys may introduce unwanted gloss differences. On the other hand, true blacks or greys are desired for black lines within a graphic object so as to reduce misregistration and imperfect color balance artifacts. Thus, an object may need to have its neutral image rendered in a manner different from the rendering of the non-neutral image. These diverse requirements cause problems when rendering objects in a composite image.

One example of this problem is the presence of an appreciable gloss differential when black text is to be rendered within a business graphic object. One conventional solution is to have the object rendered utilizing all of the primary colors resulting in the black text being rendered using process black (cyan, magenta, and yellow). By rendering the text with process black, the text will have the appearance of having a high gloss which is not necessarily desirable from a user's standpoint. Most user prefer a low gloss for text which cannot be realized with process black. Another possible conventional solution, from the standpoint of the obtaining neutrals, is the utilization of a 100% under color removal (UCR) strategy. However, this strategy may reduce the chroma of shadow regions and suffer from other color fidelity problems.

Another example of this problem is white point shifts caused by expert color control color adjustments, which allow for user control of various color attributes, such as lightness, contrast, chroma, and color balance. White point shifts are desirable for bitmap objects since these types of shifts occur in natural scenes; however, in graphic and text objects, it is desirable to have the expert color control adjustment leave the white points unaltered and unshifted since white points shifting in graphic and text objects create undesirable artifacts.

Not only do various objects require different neutral rendering processes, but the neutral items within an object may each require unique rendering processes. For example, an object may be classified as a graphic object. Moreover, this graphic object type may include a black line and/or fill. Although black lines and fills share many common rendering characteristics as members of the graphic object, black lines and fills differ with respect to neutral rendering. More specifically, black lines should be rendered as single component black rather than process black to reduce misregistration and imperfect color balance artifacts. On the other hand, black fills should be rendered as process black rather than single component black in order to reduce differential gloss effects that may be evident in color and black sweeps and to reduce black fill dropouts due to gloss differences with filled color areas.

Therefore, it is desirable to utilize an object oriented processing and rendering system which allows for object oriented neutral rendering and provide a framework for features that effect neutral rendering. Moreover, it is desirable to have an object oriented neutral processing and rendering system which optimizes the rendering of neutral colors based upon partitioning of objects and of types which can be further optimized by partitioning each object type into object sub-types. In other words, it is desirable to have a processing and rendering system which allows for common rendering characteristics to be identified by the object type and rendering fine tuning to be performed based upon the object sub-type.

SUMMARY OF THE PRESENT INVENTION

One aspect of the present invention is a method for classifying object oriented image data to be rendered by an object oriented rendering system. This method receives object oriented image data to be rendered, classifies and assigns to the object oriented image data to be rendered one of a plurality of possible first level object types, and classifies and assigns to the object oriented image data to be rendered one of a plurality of possible second level object types related to the first level object type assigned to the object to be rendered.

Another aspect of the present invention is a method for rendering object oriented image data using an object oriented rendering system. This method receives object oriented image data to be rendered, classifies the object oriented image data as a particular object type, classifies the object oriented image data as a particular object sub-type, the object sub-type corresponding to the classified object type, generating a set of rendering characteristics based on the classified object type, modifying a portion of the set of rendering characteristics based on the classified object sub-type, and rendering the object oriented image data based upon the modified set of rendering characteristics.

Further objects and advantages of the present invention will become apparent from the following descriptions of the various embodiments and characteristic features of the present invention.

BRIEF DESCRIPTION OF THE DRAWINGS

The following is a brief description of each drawing used to describe the present invention, and thus, are being presented for illustrative purpose only and should not be limitative of the scope of the present invention, wherein.

DETAILED DESCRIPTION OF THE PRESENT INVENTION

The following will be a detailed description of the drawings illustrated in the present invention. In this description, as well as in the drawings, like reference numerals represent like devices, circuits, or equivalent circuits which perform the equivalent functions.

As noted above, the present invention is directed to object oriented printing or rendering. The actual rendering process can be carried by a variety of rendering processes, such as laser xerography, inkjet, etc. For the sake of brevity, a laser xerographic system will be described below with respect to the present invention.

In the laser xerographic printing process, an electrostatic charge pattern or latent image corresponding to an original is formed on an insulating medium. A viewable record is then produced by developing the latent image with particles of granulated material to form a powder image thereof. Thereafter, the visible powder image is fused to the insulating medium, or transferred to a suitable support material and fused thereto. Development of the latent image is achieved by bringing a developer mix into contact therewith. Typical developer mixes generally comprise dyed or colored thermoplastic particles of granulated material known in the art as toner particles, which are mixed with carrier granules, such as ferromagnetic granules. When appropriate, toner particles are mixed with carrier granules and the toner particles are charged triboelectrically to the correct polarity. As the developer mix is brought into contact with the electrostatic latent image, the toner particles adhere thereto. However, as toner particles are depleted from the developer mix, additional toner particles must be supplied.

Figure 1:
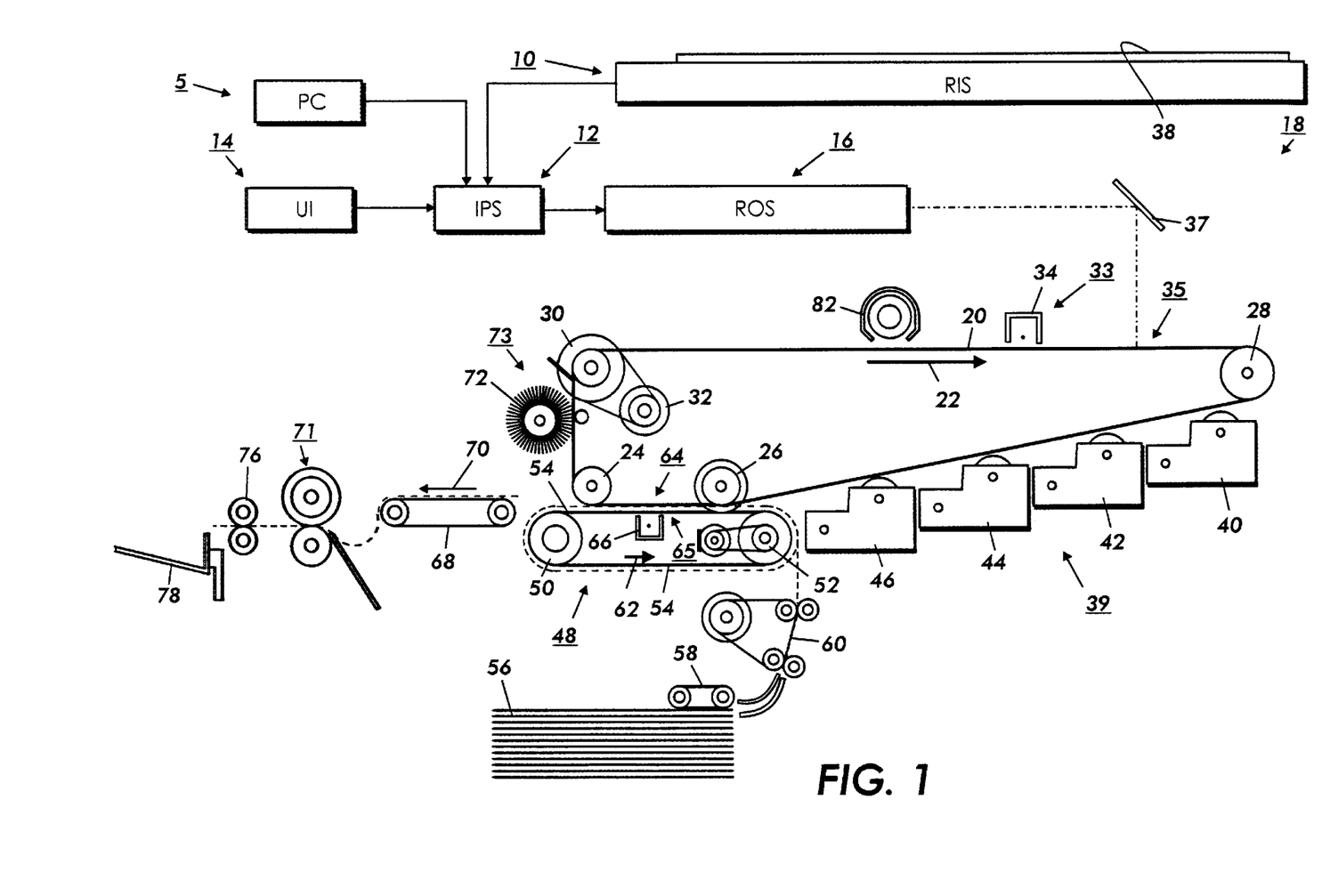
FIG. 1 illustrates a block diagram of a typical xerographic color rendering system.

An example of an electrostatic digital color copier is shown in FIG. 1. FIG. 1 is a schematic elevational view showing an exemplary electrophotographic printing/copying machine and a networked PC. An ESS (electronic subsystem) or image processing station (both referred to as IPS), indicated generally by the reference numeral 12, contains data processing and controller electronics which prepare and manage the image data flow to a raster output scanner (ROS) indicated generally by the reference numeral 16. A network of one or more personal computers (PC), indicated generally by the reference numeral 5, is shown interfacing with or in communication with IPS 12. A user interface (UI), indicated generally by the reference numeral 14, is also in communication with IPS 12.

UI 14 enables an operator to control and monitor various operator adjustable functions and maintenance activities. The operator actuates the appropriate keys of UI 14 to adjust the parameters of the copy. UI 14 may be a touch screen, or any other suitable control panel, providing an operator interface with the system. The output signal from UI 14 is transmitted to IPS 12. UI 14 may also display electronic documents on a display screen (not shown in FIG. 1), as well as carry out the image rendering selections.

As further shown in FIG. 1, a multiple color original document 38 may be positioned on (optional) raster input scanner (RIS), indicated generally by the reference numeral 10. The RIS contains document illumination lamps, optics, a mechanical scanning drive, and a charge coupled device (CCD array) or full width color scanning array. RIS 10 captures the entire image from original document 38 and converts it to a series of raster scan lines and moreover measures a set of primary color densities, i.e., red, green and blue densities, at each point of the original document. RIS 10 may provide data on the scanned image to IPS 12, indirectly to PC 5 and/or directly to PC 5.

Documents in digital or other forms may be created, screened, modified, stored and/or otherwise processed by PC 5 prior to transmission/relay to IPS 12 for printing on printer 18. The display of PC 5 may show electronic documents on a screen (not shown in FIG. 1). IPS 12 may include the processor(s) and controller(s) (not shown in FIG. 1) required to perform the adaptive image rendering system of the present invention.

IPS 12 also may transmit signals corresponding to the desired electronic or scanned image to ROS 16, which creates the output copy image. ROS 16 includes a laser with rotating polygon mirror blocks. The ROS illuminates, via mirror 37, the charged portion of a photoconductive belt 20 of a printer or marking engine, indicated generally by the reference numeral 18, at a predetermined rate of MXN pixels per inch, to achieve a set of subtractive primary latent images. MXN may represent 400×400 dpi (dots per inch), 600×600 dpi, or even asymmetrical resolutions, such as 300×1200 dpi.

The ROS will expose the photoconductive belt to record the latent images which correspond to the signals transmitted from IPS 12. One latent image is developed with cyan developer material. Another latent image is developed with magenta developer material, and the third latent image is developed with yellow developer material. A black latent image may be developed in lieu of or in addition to other (colored) latent images. These developed images are transferred to a copy sheet in superimposed registration with one another to form a multicolored image on the copy sheet. This multicolored image is then fused to the copy sheet forming a color copy.

With continued reference to FIG. 1, printer or marking engine 18 is an electrophotographic printing machine. Photoconductive belt 20 of marking engine 18 is preferably made from a photoconductive material. The photoconductive belt moves in the direction of arrow 22 to advance successive portions of the photoconductive surface sequentially through the various processing stations disposed about the path of movement thereof. Photoconductive belt 20 is entrained about rollers 23 and 26, tensioning roller 28, and drive roller 30. Drive roller 30 is rotated by a motor 32 coupled thereto by suitable means such as a belt drive. As roller 30 rotates, it advances belt 20 in the direction of arrow 22.

Initially, a portion of photoconductive belt 20 passes through a charging station, indicated generally by the reference numeral 33. At charging station 33, a corona generating device 34 charges photoconductive belt 20 to a relatively high, substantially uniform potential.

Next, the charged photoconductive surface is rotated to an exposure station, indicated generally by the reference numeral 35. Exposure station 35 receives a modulated light beam corresponding to information derived by RIS 10 having multicolored original document 38 positioned thereat. The modulated light beam impinges on the surface of photoconductive belt 20. The beam illuminates the charged portion of the photoconductive belt to form an electrostatic latent image. The photoconductive belt is exposed three or four times to record three or four latent images thereon. If a hi-fi color system is utilized, the photoconductive belt with be exposed for each primary color in the development system; i.e., in a hi-fi color system having the primary colors of cyan, magenta, yellow, orange, and black, the photoconductive belt will be exposed 5 times.

After the electrostatic latent images have been recorded on photoconductive belt 20, the belt advances such latent images to a development station, indicated generally by the reference numeral 39. The development station includes four individual developer units indicated by reference numerals 40, 42, 44 and 46. The developer units are of a type generally referred to in the art as "magnetic brush development units."

Typically, a magnetic brush development system employs a magnetizable developer material including magnetic carrier granules having toner particles adhering triboelectrically thereto. The developer material is continually brought through a directional flux field to form a brush of developer material. The developer material is constantly moving so as to continually provide the brush with fresh developer material. Development is achieved by bringing the brush of developer material into contact with the photoconductive surface. Developer units 40, 42, and 44, respectively, apply toner particles of a specific color which corresponds to the complement of the specific color separated electrostatic latent image recorded on the photoconductive surface.

The color of each of the toner particles is adapted to absorb light within a preselected spectral region of the electromagnetic wave spectrum. For example, an electrostatic latent image formed by discharging the portions of charge on the photoconductive belt corresponding to the green regions of the original document will record the red and blue portions as areas of relatively high charge density on photoconductive belt 20, while the green areas will be reduced to a voltage level ineffective for development. The charged areas are then made visible by having developer unit 40 apply green absorbing (magenta) toner particles onto the electrostatic latent image recorded on photoconductive belt 20.

Similarly, a blue separation is developed by developer unit 42 with blue absorbing (yellow) toner particles, while the red separation is developed by developer unit 44 with red absorbing (cyan) toner particles. Developer unit 46 contains black toner particles and may be used to develop the electrostatic latent image formed from a black and white original document. Each of the developer units is moved into and out of an operative position. In the operative position, the magnetic brush is substantially adjacent the photoconductive belt, while in the nonoperative position, the magnetic brush is spaced therefrom. During development of each electrostatic latent image, only one developer unit is in the operative position, the remaining developer units are in the nonoperative position.

After development, the toner image is moved to a transfer station, indicated generally by the reference numeral 65. Transfer station 65 includes a transfer zone, generally indicated by reference numeral 64. In transfer zone 64, the toner image is transferred to a sheet of support material, such as plain paper amongst others. At transfer station 65, a sheet transport apparatus, indicated generally by the reference numeral 48, moves the sheet into contact with photoconductive belt 20. Sheet transport 48 has a pair of spaced belts 54 entrained about a pair of substantially cylindrical rollers 50 and 53. A sheet gripper (not shown in FIG. 1) extends between belts 54 and moves in unison therewith.

A sheet 25 is advanced from a stack of sheets 56 disposed on a tray. A friction retard feeder 58 advances the uppermost sheet from stack 56 onto a pre-transfer transport 60. Transport 60 advances the sheet (not shown in FIG. 1) to sheet transport 48. The sheet is advanced by transport 60 in synchronism with the movement of the sheet gripper. The sheet gripper then closes securing the sheet thereto for movement therewith in a recirculating path. The leading edge of the sheet (again, not shown in FIG. 1) is secured releasably by the sheet gripper.

As belts 54 move in the direction of arrow 62, the sheet moves into contact with the photoconductive belt, in synchronism with the toner image developed thereon. In transfer zone 64, a corona generating device 66 sprays ions onto the backside of the sheet so as to charge the sheet to the proper magnitude and polarity for attracting the toner image from photoconductive belt 20 thereto. The sheet remains secured to the sheet gripper so as to move in a recirculating path for three cycles. In this way, three or four different color toner images are transferred to the sheet in superimposed registration with one another.

One skilled in the art will appreciate that the sheet may move in a recirculating path for four cycles when under color removal (UCR) is used. Each of the electrostatic latent images recorded on the photoconductive surface is developed with the appropriately colored toner and transferred, in superimposed registration with one another, to the sheet to form the multicolored copy of the colored original document. After the last transfer operation, the sheet transport system directs the sheet to a vacuum conveyor 68. Vacuum conveyor 68 transports the sheet, in the direction of arrow 70, to a fusing station, indicated generally by the reference numeral 71, where the transferred toner image is permanently fused to the sheet. Thereafter, the sheet is advanced by a pair of rolls 76 to a catch tray 78 for subsequent removal therefrom by the machine operator.

The final processing station in the direction of movement of belt 20, as indicated by arrow 22, is a photoreceptor cleaning apparatus, indicated generally by the reference numeral 73. A rotatably mounted fibrous brush 72 may be positioned in the cleaning station and maintained in contact with photoconductive belt 20 to remove residual toner particles remaining after the transfer operation. Thereafter, lamp 82 illuminates photoconductive belt 20 to remove any residual charge remaining thereon prior to the start of the next successive cycle.

Figure 7:
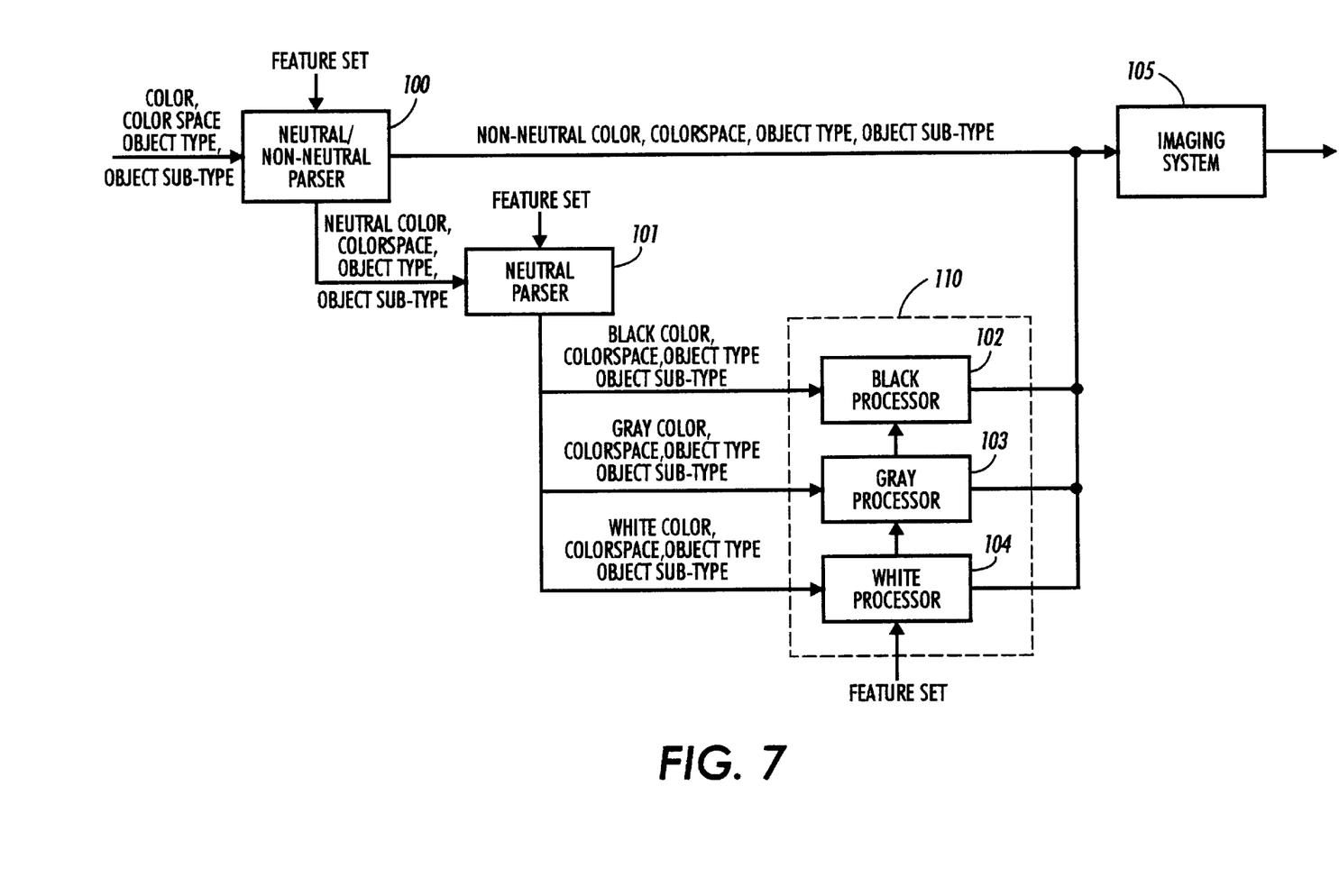
FIG. 7 shows block diagram illustrating a system for processing object oriented image data according to the concepts of the present invention.
Figure 8:
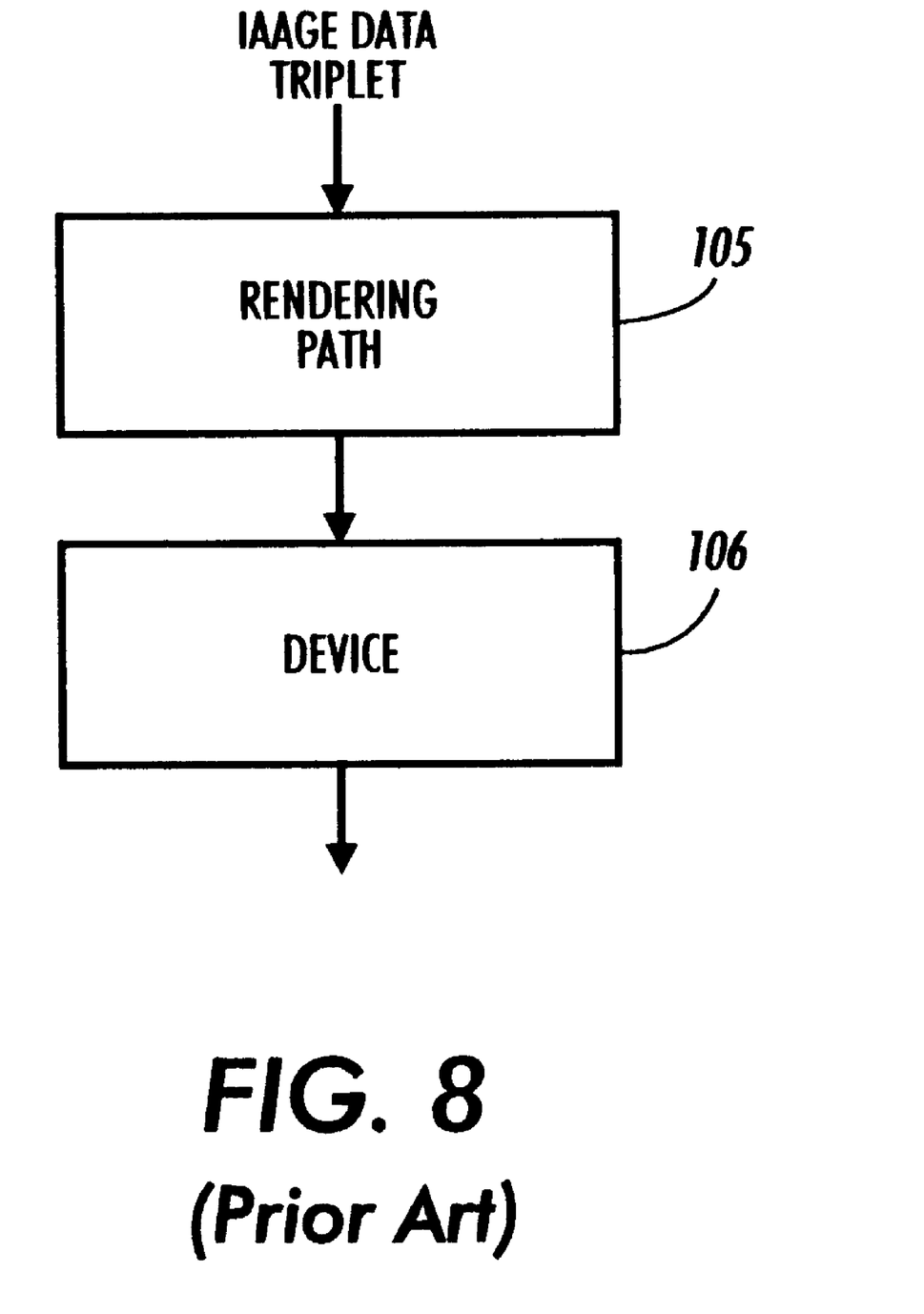
FIG. 8 is a block diagram showing a conventional object oriented rendering system.

As noted above, conventional object oriented rendering systems render based upon the object notwithstanding other object attributes, such as color. An example of such a system is illustrated in FIG. 7 wherein a triplet of data (color, colorspace, and object information) is fed into a rendering path circuit 105 which will process the triplet according to the object designation. After being processed the data is passed onto a rendering device 106 for rendering. By utilizing this conventional system to process and render both neutral image data and non-neutral image data, the conventional rendering system sacrifices color fidelity.

Figure 2:
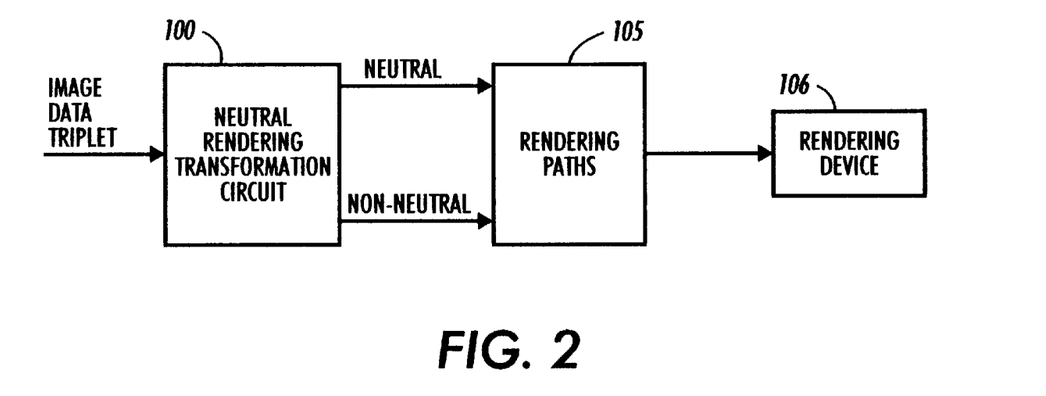
FIG. 2 shows a block diagram illustrating a system for rendering object oriented image data according to the concepts of the present invention.

To avoid these problems with the conventional devices, the present invention, as illustrated in FIG. 2, transforms the neutral color data prior to it being sent to the rendering path circuit 105. More specifically, object oriented image data is received by a neutral rendering transformation circuit 100 which parses the incoming image data into neutral image data and non-neutral image data. The parsed neutral image data has its color image data and colorspace data transformed, and the transformed neutral image data and the non-neutral image data are fed into an imaging system 105.

Thereafter, the processed neutral color image data and the processed non-neutral color image data are fed into a rendering device 106 which converts the image data into an image which can be readily seen by a user. This rendering device may be either a display screen or a printing system.

Figure 3:
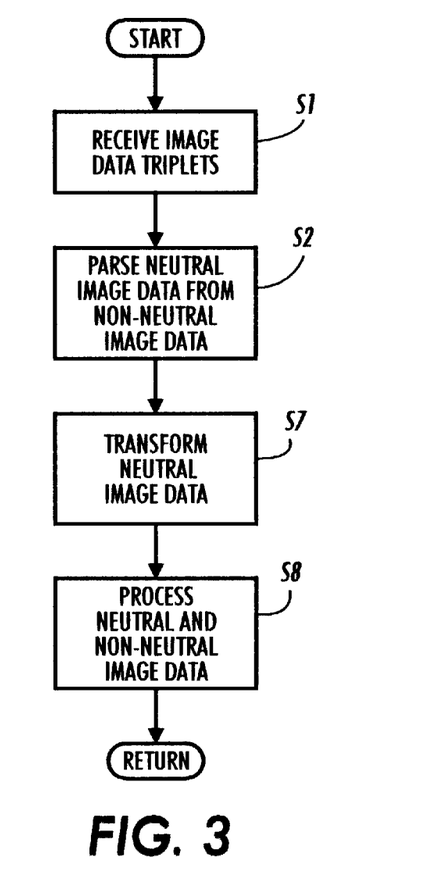
FIG. 3 is a flowchart illustrating a process for rendering object oriented image data according to the concepts of the present invention.

FIG. 3 illustrates the process utilized by the system illustrated in FIG. 2. More specifically, as illustrated in FIG. 3, step S1 receives image data in the form of image data triplets. An image data triplet consists of color image data, data indicating the color space, and data indicating the object type of the incoming image data. The incoming stream of color image data triplets are parsed at step S2 based upon the feature set associated with the rendering of the object. The feature set refers to a set of controls that configure the image processing circuit. The incoming triplets are parsed into two sets of triplets at step S2. One set of triplets contains neutral colors and the other set of triplets contain non-neutral colors.

The triplets containing neutral image data have their color and colorspace information transformed at step S7. Thereafter, the transformed neutral image data and non-neutral image data are processed utilizing an object dependent device pathway in step S8.

Figure 4:
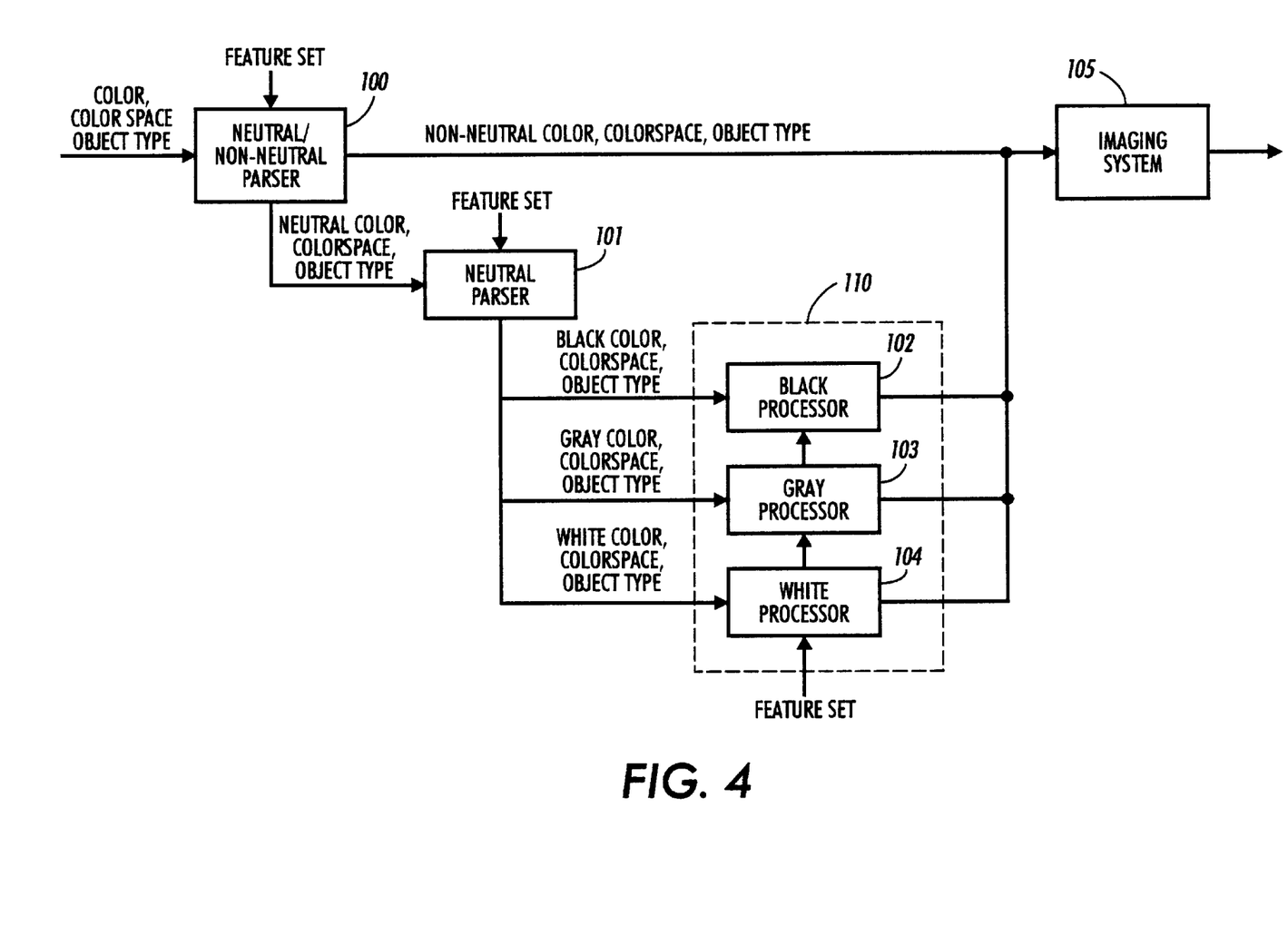
FIG. 4 shows a block diagram illustrating a system for processing object oriented image data according to the concepts of the present invention.

In one embodiment of the present invention, as illustrated in FIG. 4, the neutral color image data is further parsed into separate components. More specifically, as illustrated in FIG. 4, a neutral/non-neutral parser circuit 100 receives an incoming stream of triplets which contain color image data, color space data, and object information. These triplets are parsed by the neutral/non-neutral parser circuit 100 into two sets of triplets wherein one set of triplets contain neutral colors and the other set of triplets contain non-neutral colors. The set containing non-neutral colors is processed in the conventional fashion by an imaging system 105.

On the other hand, the triplets containing the neutral color image data triplets (neutral color image data, color space data, and object type data) are fed into a neutral parser circuit 101 which further parses the incoming triplets into three separate sets of triplets based on the feature set.

One triplet set contains black triplets, a second triplet set contains grey triplets, and a third triplet set contains white triplets wherein each triplet contains color image data, color space data, and object type data. The resulting parsed triplets are then processed independently according to the feature set to transform their color image data and colorspace data.

More specifically, the triplets corresponding to the black image data are processed by a black processor 102; whereas the triplets having the grey image data are processed by a grey processor 103. Lastly, the triplets containing the white image data are processed by a white processor 104. The black processor 102, grey processor 103, and white processor 104 are contained within a neutral processing circuit 110. The processed neutral data is then fed into the imaging system 105 where this neutral image data will be processed by the rest of the system in the conventional manner to produce an output that meets the proper neutral rendering requirements.

Figure 5:
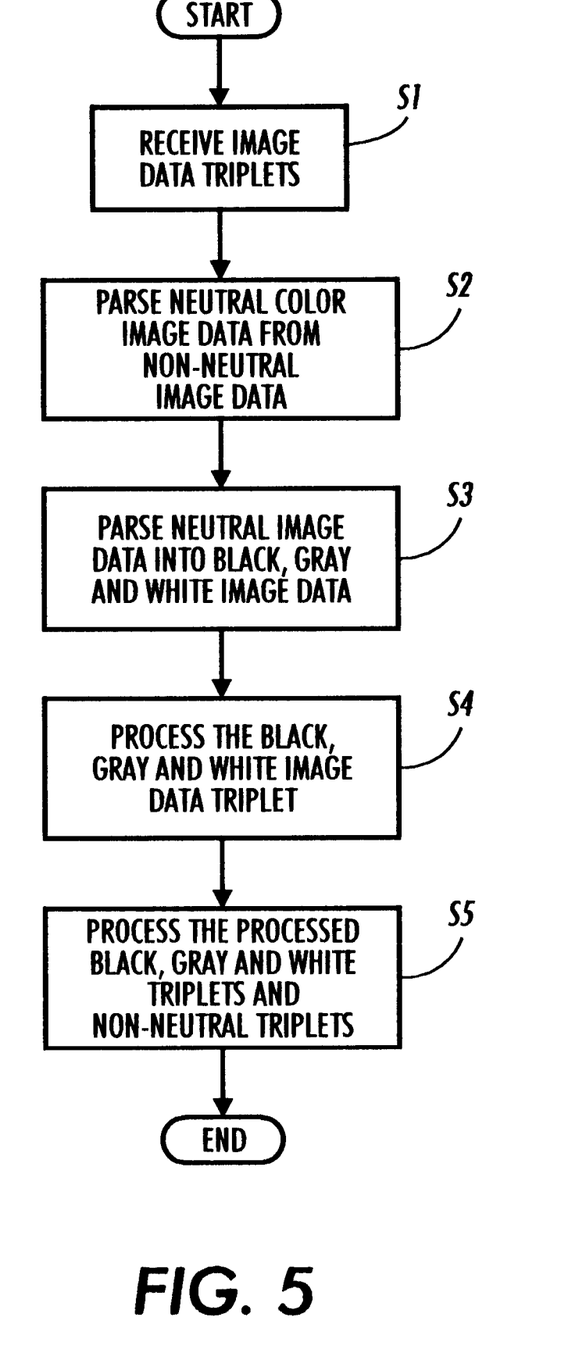
FIG. 5 show a flowchart illustrating the processing of object oriented image data according to the concepts of the present invention.

FIG. 5 illustrates a method for rendering of neutral color image data according to the concepts of the present invention and the system illustrated in FIG. 4. As illustrated in FIG. 5, step S1 receives image data in the form of triplets. This image data is parsed into neutral color image data and non-neutral color image data at step S2. The parsed neutral color image data is then parsed into black image data, grey image data, and white image data at step S3. The black image data, grey image data, and white color image data triplets are then each processed individually at step S4. The process black image data, grey image data, and white image data triplets are then processed again in an imaging system along with the non-neutral image data at step S5.

An example of a software implementation of the above described method is set forth in Table 2 below. This table sets forth an example of software code, as implemented in PostScript™ and C, which carries out the functions described above. Although the process of the present invention has been implemented in software, it can also be readily implemented in hardware.

TABLE 2

```
NOTICE:  Copyright 1996, 1997 Xerox Corporation
         All Rights Reserved
*
*        Contains proprietary information of
*        Xerox Corporation and is protected under the copyright
*        laws as an unpublished work.
*
*
PUBLIC procedure neutralRenderingInit();
PUBLIC procedure preNeutralRendering();
PUBLIC procedure graphicPostNeutralRendering();
PUBLIC procedure textPostNeutralRendering();
PUBLIC procedure preStringwidth();
PUBLIC procedure postStringwidth();
#include PACKAGE_SPECS
#include CUSTOMOPS
#include UTIL
#include "neutralRendering.h"
/*******************************************/
#define RETURN_BOOL
#define PATTERN_PAINT_TYPE_1
#define TRUE 1
#define FALSE 0
#define CURRENTPOINT      40
#define MOVETO            107
#define CURRENTCOLOR      213
#define CURRENTCOLORSPACE 214
#define SETCOLOR          221
#define SETCOLORSPACE     222
#define CURRENTOVERPRINT  433
#define SETOVERPRINT      450
#define DEVICE_CIEBASEDABC 471
#define DEVICE_CIEBASEDDEFG 478 /* CIEBasedDEFG isn't
defined by Adobe */
#define DEVICE_CIEBASEDA  470
#define DEVICE_CMYK 472
#define DEVICE_GREY 473
#define DEVICE_RGB  474
#define PATTERN     476
#define GSAVE       78
#define GRESTORE    77
#define POP         117
#define SETGREY     150
#define RGB_BLACK 0
#define RGB_WHITE 765 /* 3*255 */
#define SET_BLACK_OVERPRINT "gsave true setoverprint [
/Separation/Black/DeviceCMYK {pop 0 0 0 1}] setcolorspace 1
setcolor"
#define SET_BLACK_OVERPRINT2 "{true setoverprint [/Separation
/Black/DeviceCMYK {pop 0 0 0 1}] setcolorspace 1 setcolor}"
#define SET_BLACK_OVERPRINT3 "{X_SetBlackOverPrint}"
#define SET_GREY         "{XSD_setgrey}"
/*******************************************/
/***********/
PRIVATE boolean gs_modified;
PRIVATE Int32 neutralNestingCount;
#ifdef RETURN_BOOL
PRIVATE boolean return_status;
#endif
/*******************************************/
/***********/
PRIVATE procedure setBlackOverprint() {
  gs_modified = TRUE;
#ifndef RETURN_BOOL
  PSExecuteString( SET_BLACK_OVERPRINT );
#else
  PSExecuteString( SET_BLACK_OVERPRINT2 );
  return_status = TRUE;
#endif
}
/*******************************************/
/***********/
PRIVATE procedure setGrey( real greyValue ) {
  gs_modified = TRUE;
#ifndef RETURN_BOOL
  PSExecuteOperator ( GSAVE );
  PSPushReal( greyValue );
  PSExecuteOperator ( SETGREY );
#else
```

TABLE 2-continued

```
  PSPushReal( greyValue );
  PSExecuteString( SET_GREY );
  return_status = TRUE;
#endif
}
/*******************************************/
/***********/
PRIVATE procedure processRGB() {
  boolean trueGrey;
  boolean blackOverPrint;
  boolean processBlack;
  Int32 component1, component2, component3, colorTemp, colorDiff;
  real realComponent1;
  realComponent1 = PSPopReal();
  component1 = realComponent1 * 255;
  component2 = PSPopReal() * 255;
  component3 = PSPopReal() * 255;
  trueGrey = PSPopBoolean();
  blackOverPrint = PSPopBoolean();
  processBlack = PSPopBoolean();
  colorTemp = component1 + component2 + component3;
  if ( colorTemp == RGB_BLACK ) {
    if (blackOverPrint) {
      setBlackOverprint();
    } else if (trueGrey && !processBlack) {
      setGrey(0.0);
    }
  } else if ( (colorTemp == RGB_WHITE) && trueGrey ) {
    setGrey(1.0);
  } else if (trueGrey) {
#if 0
    colorDiff = component1 - component2;
    colorTemp = os_abs(colorDiff);
    colorDiff = component1 - component3;
    colorTemp += os_abs(colorDiff);
    colorDiff = component2 - component3;
    colorTemp += os_abs(colorDiff);
    if (colorTemp <= 3) {
#else
    if ( (component1 == component2) && (component1 ==
component3) ) {
#endif
      setGrey( realComponent1 );
    }
  }
}
/*******************************************/
/***********/
PRIVATE procedure processGrey() {
  boolean blackOverPrint;
  real realComponent1;
  realComponent1 = PSPopReal();
  blackOverPrint = PSPopBoolean();
  PSExecuteOperator(POP); /* processBlack */
  if ( blackOverPrint && (realComponent1 == 0.0) ) {
    SetBlackOverprint();
  }
}
/*******************************************/
/***********/
PRIVATE procedure processCMYK() {
  boolean trueGrey;
  boolean blackOverPrint;
  boolean processBlack;
  Int32 yellow, magenta, cyan, black, colorTemp, colorDiff;
  black = PSPopReal() * 255;
  yellow = PSPopReal() * 255;
  magenta = PSPopReal() * 255;
  cyan = PSPopReal() * 255;
  trueGrey = PSPopBoolean();
  blackOverPrint = PSPopBoolean();
  processBlack = PSPopBoolean();
#if 0
  colorDiff = yellow - magenta;
  colorTemp = os_abs(colorDiff);
  colorDiff = yellow - cyan;
  colorTemp += os_abs(colorDiff);
  colorDiff = magenta - cyan;
  colorTemp += os_abs(colorDiff);
```

TABLE 2-continued

```
        if(colorTemp <= 3) {
#else
    if ( ( yellow == magenta) && (yellow == cyan) ) {
#endif
        /* neutral */
        if ( blackOverPrint && (black == 255) ) {
            setBlackOverprint();
        } else if ( trueGrey ) {
            if ( (black==0) && (cyan==0) && (magenta==0) &&
                 (yellow==0) ){
                /* white */
                setGrey( 1.0 );
            } else {
                colorTemp = 255 - (black + cyan);
                if (colorTemp > 0) {
                    /* grey */
                    setGrey((real)colorTemp/255);
                } else {
                    /* black */
                    if (!processBlack) setGrey ( 0.0 );
                }
            }
        }
    }
}
/*************************************************************
***********/
PRIVATE procedure processCIEBasedABC() {
    PSObject rangeABC;
    PSPopTempObject( arrayType, &rangeABC );
    if ( (rangeABC.val.arrayval[0].val.ival == 0) &&
         (rangeABC.val.arrayval[1].val.ival == 1) &&
         (rangeABC.val.arrayval[2].val.ival == 0) &&
         (rangeABC.val.arrayval[3].val.ival == 1) &&
         (rangeABC.val.arrayval[4].val.ival == 0) &&
         (rangeABC.val.arrayval[5].val.ival == 1) ) {
        processRGB();
    } else {
        PSExecuteOperator(POP); /* C */
        PSExecuteOperator(POP); /* B */
        PSExecuteOperator(POP); /* A */
        PSExecuteOperator(POP); /* trueGrey */
        PSExecuteOperator(POP); /* blackOverPrint */
        PS ExecuteOperator(POP); /* processBlack */
    }
}
/*************************************************************
***********/
PRIVATE procedure processCIEBasedDEFG() {
    PSObject rangeDEFG;
    PSPopTempObject( arrayType, &rangeDEFG );
    if ( (rangeDEFG.val.arrayval[0].val.ival == 0) &&
         (rangeDEFG.val.arrayval[1].val.ival == 1) &&
         (rangeDEFG.val.arrayval[2].val.ival == 0) &&
         (rangeDEFG.val.arrayval[3].val.ival == 1) &&
         (rangeDEFG.val.arrayval[4].val.ival == 0) &&
         (rangeDEFG.val.arrayval[5].val.ival == 1) &&
         (rangeDEFG.val.arrayval[6].val.ival == 0) &&
         (rangeDEFG.val.arrayval[7].val.ival == 1) ) {
        ProcessCMYK();
    } else {
        PSExecuteOperator(POP); /* G */
        PSExecuteOperator(POP); /* F */
        PSExecuteOperator(POP); /* E */
        PSExecuteOperator(POP); /* D */
        PSExecuteOperator(POP); /* trueGrey */
        PSExecuteOperator(POP); /* blackOverPrint */
        PSExecuteOperator(POP); /* processBlack */
    }
}
/*************************************************************
***********/
PRIVATE procedure processCIEBasedA() {
    PSObject rangeA;
    boolean blackOverPrint;
    boolean trueGrey;
    real    realComponent1;
    PSPopTempObject( arrayType, &rangeA );
    if ( (rangeA.val.arrayval[0].val.ival == 0) &&
         (rangeA.val.arrayval[1].val.ival == 1) ) {
        realComponent1 = PSPopReal();
        trueGrey = PSPopBoolean();
        blackOverPrint = PSPopBoolean();
        PSExecuteOperator(POP); /* processBlack */
        if ( blackOverPrint && (realComponent1 == 0.0) ) {
            SetBlackOverprint();
        } else if (trueGrey) {
            setGrey (realComponent1);
        }
    } else {
        PSExecuteOperator(POP); /* A */
        PSExecuteOperator(POP); /* trueGrey */
        PSExecuteOperator(POP); /* blackOverPrint */
        PSExecuteOperator(POP); /* processBlack */
    }
}
/*************************************************************
***********/
PRIVATE procedure processPATTERN() {
    integer PaintType;
    PaintType = PSPopInteger();
    PS ExecuteOperator(POP); /* blackOverPrint */
    PSExecuteOperator(POP); /* processBlack */
#ifdef PATTERN_PAINT_TYPE_1
    if ((PaintType == 1) && (neutralNestingCount == 1)) {
        neutralNestingCount = 0;
    }
#endif
}
/*************************************************************
***********/
PUBLIC procedure neutralRenderingInit() {
    gs_modified = FALSE;
    neutralNestingCount = 0;
}
/*************************************************************
***********/
PUBLIC procedure preNeutralRendering() {
    Int32    colorspaceID;
    colorspaceID = PSPopInteger();
#ifdef RETURN_BOOL
    return_status = FALSE;
#endif
    neutralNestingCount++;
    if (neutralNestingCount > 1) {
        /* remove parameters from the stack */
        switch (colorspaceID) {
            case DEVICE_RGB:
                PSExecuteOperator(POP); /* blue */
                PSExecuteOperator(POP); /* green */
                PSExecuteOperator(POP); /* red */
                PSExecuteOperator(POP); /* trueGrey */
                break;
            case DEVICE_CMYK:
                PSExecuteOperator(POP); /* black */
                PSExecuteOperator(POP); /* yellow */
                PSExecuteOperator(POP); /* magenta */
                PSExecuteOperator(POP); /* cyan */
                PSExecuteOperator(POP); /* trueGrey */
                break;
            case DEVICE_GREY:
                PSExecuteOperator(POP); /* grey */
                            /* trueGrey not sent */
                break;
            case DEVICE_CIEBASEDABC:
                PSExecuteOperator(POP); /* range array */
                PSExecuteOperator(POP); /* C */
                PSExecuteOperator(POP); /* B */
                PSExecuteOperator(POP); /* A */
                PSExecuteOperator(POP); /* trueGrey */
                break;
            case DEVICE_CIEBASEDDEFG:
                PSExecuteOperator(POP); /* range array */
                PSExecuteOperator(POP); /* G */
                PSExecuteOperator(POP); /* F */
                PSExecuteOperator(POP); /* E */
                PSExecuteOperator(POP); /* D */
                PSExecuteOperator(POP); /* trueGrey */
```

TABLE 2-continued

```
    break;
  case DEVICE_CIEBASEDA:
    PSExecuteOperator(POP); /* range array */
    PSExecuteOperator(POP); /* A */
    PSExecuteOperator(POP); /* trueGrey */
    break;
  case PATTERN:
    PSExecuteOperator(POP); /* PaintType */
                /* trueGrey not sent */
    break;
  }
  PSExecuteOperator(POP); /* processBlack */
  PSExecuteOperator(POP); /* blackOverPrint */
} else {
  switch (colorspaceID) {
  case DEVICE_RGB:
    processRGB();
    break;
  case DEVICE_GREY:
    processGrey();
    break;
  case DEVICE_CMYK:
    ProcessCMYK();
    break;
  case DEVICE_CIEBASEDABC:
    processCIEBasedABC();
    break;
  case DEVICE_CIEBASEDDEFG:
    processCIEBasedDEFG();
    break;
  case DEVICE_CIEBASEDA:
    processCIEBasedA();
    break;
  case PATTERN:
    processPATTERN();
    break;
  default:
    PSExecuteOperator(POP); /* processBlack */
    PSExecuteOperator(POP); /* BlackOverprint */
    break;
  }
}
#ifdef RETURN_BOOL
  PSPushBoolean(return_status);
#endif
}
/*************************************************
************/
PUBLIC procedure graphicPostNeutralRendering() {
#ifdef RETURN_BOOL
  boolean status = FALSE;
#endif
  neutralNestingCount --;
  if ( (neutralNestingCount == 0) && gs_modified ) {
    gs_modified = FALSE;
#ifndef RETURN_BOOL
    PSExecuteOperator( GRESTORE );
#else
    status = TRUE;
#endif
  }
#ifdef PATTERN_PAINT_TYPE_1
  else if (neutralNestingCount < 0) {
    neutralNestingCount=0;
  }
#endif
#ifdef RETURN_BOOL
  PSPushBoolean(status);
#endif
}
/*************************************************
************/
PUBLIC procedure textPostNeutral Rendering() {
#ifdef RETURN_BOOL
  boolean status = FALSE;
#endif
  neutralNestingCount --;
  if ( (neutralNestingCount == 0) && (gs_modified ) ){
    gs_modified = FALSE;
```

TABLE 2-continued

```
#ifndef RETURN_BOOL
    PSExecuteOperator( CURRENTPOINT );
    PSExecuteOperator( GRESTORE );
    PSExecuteOperator( MOVETO );
#else
    status = TRUE;
#endif
  }
#ifdef PATTERN_PAINT_TYPE_1
  else if (neutralNestingCount < 0) {
    neutralNestingCount=0;
  }
#endif
#ifdef RETURN_BOOL
  PSPushBoolean(status);
#endif
}
/*************************************************
************/
PUBLIC procedure preStringwidth() {
  neutralNestingCount++;
}
/*************************************************
************/
PUBLIC procedure postStringwidth() {
  neutralNestingCount--;
}
```

The neutral rendering system and method described above avoids the problems associated with systems that perform expert color adjustments to adjust various color characteristics, such as lightness, contrast, chroma, color balance, etc. For example, an expert control system may be programmed so that the neutrals for certain object types, such as text and graphic, are to remain unaltered by the expert controls. The neutral rendering system of the present invention parses out and processes the neutral color, colorspace and object type triplets in a path of the system that is not affected by the expert controls.

In addition, the present invention also provides further advantages by utilizing an object oriented rendering system that classifies objects into object types and object sub-types. A more detailed explanation of this system will be set forth below in the description of FIGS. 6 and 7.

As discussed above, object oriented rendering systems optimize rendering based upon partitioning of objects into types, such as bitmap, text, and graphic. This tagging method has certain limitations, which can be overcome by sub-typing. The object type/sub-type tagging method allows for common rendering characteristics to be identified by the object type and rendering fine-tuning to be performed based upon the sub-type.

As an example, sweeps or gradient fills can be considered a sub-type of a graphic object type. Certain rendering characteristics, such as color rendering, may be shared with the graphic object type, while other characteristics, such as halftoning, may be optimized for sweeps. In a preferred embodiment of the present invention, the object type/sub-type combinations are as follows:

| Object Type | Object Sub-Type | Example |
| --- | --- | --- |
| Bitmap | Image | image of a real world scene |
| Bitmap | Graphic | scanned corporate logo |

-continued

| Object Type | Object Sub-Type | Example |
| --- | --- | --- |
| Graphic | Fill | area fills |
| Graphic | Line | |
| Graphic | Sweep | gradient fills |
| Text | Halftoned | |
| Text | Solid | |

To further explain this concept, it will be assumed that there are three object types (Bitmap, Graphic and Text) and two sub-types for graphic objects (lines and fills). Line and fill sub-types share many common rendering characteristics as members of the graphic object type, but differ with respect to neutral rendering. Black lines are rendered as single component, rather than process, to reduce misregistration and imperfect color balance artifacts. Black fills are rendered as process black rather than single component blacks in order to reduce differential gloss effects that are evident in color and black sweeps and to reduce black fill "dropouts" due to gloss differences with filled colored areas.

Figure 6:
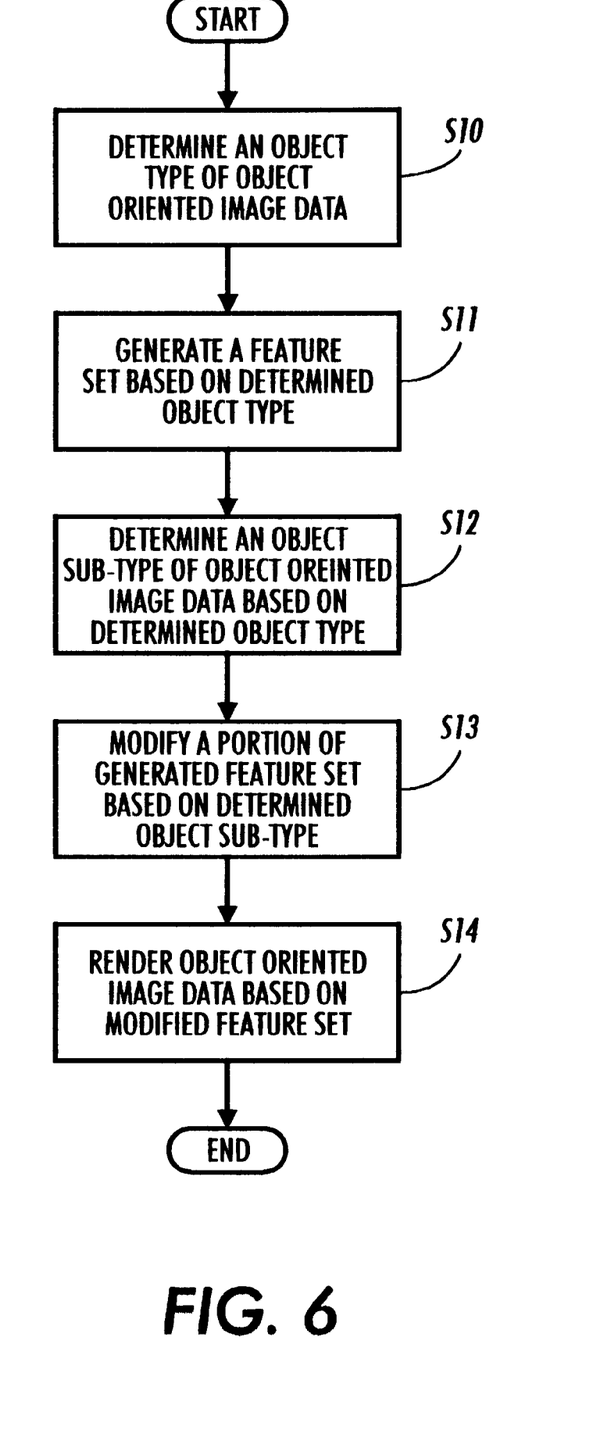
FIG. 6 shows a flowchart illustrating the rendering of object oriented image data according to the concepts of the present invention.

FIG. 6 illustrates a process for rendering neutral color image data based on object types and object sub-types classification concepts discussed above. As illustrated in FIG. 6, the process determines an object type for the incoming object oriented image data at step S10. Upon determining the object type, a feature set is generated based upon the determined object type at step S11. The object oriented image data is further classified to determine an object sub-type wherein the object's sub-type determination is based upon the determined object type at step S12.

Upon determining an object sub-type, a portion of the generated feature set is modified based upon the determined object sub-type at step S13. Lastly, the object oriented image data is rendered based upon the modified feature set at step S14.

FIG. 7 illustrates a system which shows the processing of object oriented image data which has been typed and sub-typed. As illustrated in FIG. 7, the neutral color image data is parsed into separate components. More specifically, as illustrated in FIG. 7, a neutral/non-neutral parser circuit 100 receives an incoming stream of quads which contain color image data, color space data, object type data, and object sub-type data. These quads are parsed by the neutral/non-neutral parser circuit 100 into two sets of quads wherein one set of quads contain neutral colors and the other set of quads contain non-neutral colors. The set containing non-neutral colors is processed in the usual conventional fashion by an imaging system 105.

On the other hand, the quads containing the neutral color image data triplets (neutral color image data, color space data, object type data, and object sub-type data) are fed into a neutral parser circuit 101 which further parses the incoming quads into three separate sets of quads based on the feature set.

One quad set contains black color quads, a second quad set contains grey color quads, and a third quad set contains white color quads wherein each quad contains color image data, color space data, object type data, and object sub-type data. The resulting parsed quads are then processed independently according to the feature set. More specifically, the quads corresponding to the black color image data are processed by a black processor 102; whereas the quads having the grey color image data are processed by a grey processor 103.

Lastly, the quads containing the white color image data are processed by a white processor 104. The black processor 102, grey processor 103, and white processor 104 are contained within a neutral color processing circuit 110. The processed neutral color data is then fed into the imaging system 105 where this neutral color image data will be processed by the rest of the system in the conventional manner to produce an output that meets the proper neutral rendering requirements.

As described above, the present invention provides a system and method for obtaining a desired neutral rendering in a fashion that does not sacrifice color fidelity and is independent of the effects of print drivers and applications on neutral rendering. The present invention also allows for object oriented neutral rendering, can be used to meet the neutral rendering requirements of systems that perform expert color adjustments, and provides a frame work for features that affect neutral rendering. Furthermore, the present invention provides a system and method which can optimize object oriented rendering by utilizing a object type and object sub-type tagging method.

Although the present invention has been described in detail above, various modifications can be implemented without departing from the spirit of the present invention. For example, the preferred embodiment of the present invention has been described with respect to a printing system; however, this method is readily implemented in a display system. Moreover, the present invention is not limited to a xerographic system but is independent of the output system and can be readily used in an inkjet environment. It is also applicable to hi-fi color systems.

While the present invention has been described with reference to various embodiments disclosed herein before, it is not to be combined to the detail set forth above, but is intended to cover such modifications or changes as made within the scope of the attached claims.

What is claimed is:

1. A method for classifying object oriented image data to be rendered by an object oriented rendering system, comprising the steps of:

(a) receiving object oriented image data to be rendered;

(b) classifying and assigning to the object oriented image data to be rendered one of a plurality of possible first level object types; and (c) classifying and assigning to the object oriented image data to be rendered one of a plurality of possible second level object types related to the first level object type assigned to the object to be rendered in said step (b).

2. The method as claimed in claim 1, wherein the plurality of possible first level object types include the classification types bitmap, graphic, and text.

3. The method as claimed in claim 2, wherein the plurality of possible second level object types related to the first level bitmap object type includes classification sub-types image and graphic.

4. The method as claimed in claim 2, wherein the plurality of possible second level object types related to the first level graphic object type includes classification sub-types fill, line and sweep.

5. The method as claimed in claim 2, wherein the plurality of possible second level object types related to the first level text object type includes classification sub-types halftone and solid.

6. The method as claimed in claim 1, further comprising the steps of:

(d) parsing the object oriented image data into non-neutral color image data and neutral color image data;

(e) parsing the neutral color image data into black color image data, gray color image data, and color image data; and (f) processing the black color image data, the gray color image data, and the color image data.

7. A method for rendering object oriented image data using an object oriented rendering system, comprising the steps of:

(a) receiving object oriented image data to be rendered;

(b) classifying the object oriented image data as a particular object type;

(c) classifying the object oriented image data as a particular object sub-type, the object sub-type corresponding to the object type classified in said step (b);

(d) generating a set of rendering characteristics based on the object type classified in said step (b);

(e) modifying a portion of the set of rendering characteristics based on the object sub-type classified in said step (c);

(f) rendering the object oriented image data based on the set of rendering characteristics as modified by said step (e).

8. The method as claimed in claim 7, wherein said step (b) classifies the object oriented image data as a graphic object type;

said step (c) classifies the object oriented image data as a line graphic object sub-type; and said step (f) renders a black line within the object oriented image data as single component black.

9. The method as claimed in claim 7, wherein said step (b) classifies the object oriented image data as a graphic object type;

said step (c) classifies the object oriented image data as a fill graphic object sub-type; and said step (f) renders a black line within the object oriented image data as process black.

10. The method as claimed in claim 7, further comprising the steps of:

(g) parsing the object oriented image data into non-neutral color image data and neutral color image data;

(h) parsing the neutral color image data into black color image data, gray color image data, and color image data;

(i) processing the black color image data, the gray color image data, and the white color image data;

(j) processing the non-neutral color image data.

* * * * *